United States Patent
Barber

(10) Patent No.: US 10,284,536 B2
(45) Date of Patent: May 7, 2019

(54) SYSTEM AND METHOD FOR CONCURRENT ADDRESS ALLOCATION AND AUTHENTICATION

(71) Applicant: FutureWei Technologies, Inc., Plano, TX (US)

(72) Inventor: Phillip Barber, McKinney, TX (US)

(73) Assignee: Futurewei Technologies, Inc., Plano, TX (US)

( * ) Notice: Subject to any disclaimer, the term of this patent is extended or adjusted under 35 U.S.C. 154(b) by 455 days.

(21) Appl. No.: 13/717,423

(22) Filed: Dec. 17, 2012

(65) Prior Publication Data

US 2013/0160081 A1 Jun. 20, 2013

Related U.S. Application Data

(60) Provisional application No. 61/576,795, filed on Dec. 16, 2011.

(51) Int. Cl.
*H04L 29/06* (2006.01)
*H04L 29/12* (2006.01)

(52) U.S. Cl.
CPC .......... *H04L 63/08* (2013.01); *H04L 61/2015* (2013.01)

(58) Field of Classification Search
CPC ......... H04L 12/24; H04L 29/06; H04L 63/08; G06F 21/44
USPC .......................................................... 726/3
See application file for complete search history.

(56) References Cited

U.S. PATENT DOCUMENTS

| | | | | |
|---|---|---|---|---|
| 5,815,664 | A * | 9/1998 | Asano ........................... | 709/227 |
| 6,925,095 | B2 * | 8/2005 | Pecen et al. ................... | 370/470 |
| 7,558,866 | B2 * | 7/2009 | Choe .................... | H04L 61/2015 |
| | | | | 709/223 |
| 7,639,681 | B2 * | 12/2009 | Kelly et al. ..................... | 370/389 |
| 7,934,004 | B2 * | 4/2011 | Zha ................................ | 709/228 |
| 8,045,530 | B2 * | 10/2011 | Haverinen et al. ........... | 370/338 |
| 2003/0193969 | A1 | 10/2003 | Pecen et al. | |
| 2006/0123118 | A1 | 6/2006 | Choe et al. | |
| 2006/0126611 | A1 | 6/2006 | Kelly et al. | |
| 2008/0282325 | A1 | 11/2008 | Oyama et al. | |
| 2009/0172174 | A1 | 7/2009 | Zha | |

FOREIGN PATENT DOCUMENTS

| | | |
|---|---|---|
| CN | 1647427 A | 7/2005 |
| CN | 1780298 A | 5/2006 |
| CN | 1832490 A | 9/2006 |
| CN | 101102265 A | 1/2008 |

OTHER PUBLICATIONS

Siep, T., et al., "Specification Framework for TGai," IEEE P802.11 Wireless LANs, IEEE 802.11-12/0151r7, Jul. 23, 2012, pp. 1-13.

(Continued)

*Primary Examiner* — Dant B Shaifer Harriman
(74) *Attorney, Agent, or Firm* — Slater Matsil, LLP

(57) ABSTRACT

A method for coordinating network entry of a device includes authenticating the device coupled to the controller, and allocating an address for the device, wherein allocating the address for the device occur concurrently with but independently of authenticating the device. The method also includes completing the network entry of the device upon successful completion of authenticating the device and allocating the address for the device.

22 Claims, 9 Drawing Sheets

(56) References Cited

OTHER PUBLICATIONS

"IEEE Standard for Information technology—Telecommunicatins and information exchange between systems Local and metropolitan area networks—Specific requirements, Part11: Wireless LAN Medium Access Control (MAC) and Physical Layer (PHY) Specifications," IEEE Std 802.11™-2012 (Revision of IEEE Std 802.11-2007), IEEE Computer Society, Sponsored by the LAN/MAN Standards Committee, Mar. 29, 2012, 2,793 pages.

"IEEE Standard for Local and metropolitan area networks—Port-Based Network Access Control," IEEE Std 802.1X™-2010, (Revision of IEEE Std 802.1X-2004), IEEE Computer Society, LAN/MAN Standards Committee, Feb. 5, 2010, 222 pages.

International Search Report and Written Opinion of Patent Cooperation Treaty (PCT), International Application No. PCT/US12/70201, Applicant Huawei Technologies Co., Ltd., dated Feb. 26, 2013, 8 pages.

Droms, R., "Dynamic Host Configuration Protocol," Networking Working Group, Request for Comments: 2131, Obsoletes: 1541, Standard Tracks, Mar. 1997, 45 pages.

Aboba, B., et al., "Wxtensible Authentication Protocol," Networking Working Group, Request for Comments: 3748, Obsoletes: 2284, Standard Tracks, Jun. 2004, 68 pages.

Vollbrecht, J., et al., "State Machines for Extensible Authentication Protocol (EAP) Peer and Authenticator," Networking Working Group, Request for Comments: 4137, Informational, Aug. 2005, 52 pages.

Fajardo, V., "State Mchines for the Protocol for Carrying Authentication for Network Access (PANA)," Networking Working Group, Request for Comments: 5609, Informational, Aug. 2009, 29 pages.

\* cited by examiner

SYSTEM AND METHOD FOR CONCURRENT ADDRESS ALLOCATION AND AUTHENTICATION

This application claims the benefit of U.S. Provisional Application No. 61/576,795, filed on Dec. 16, 2011, entitled "Systems and Methods for Concurrent Decoupled Network Address Allocation and Authentication," which application is hereby incorporated herein by reference.

TECHNICAL FIELD

The present disclosure relates generally to digital communications, and more particularly to a system and method for concurrent address allocation and authentication.

BACKGROUND

Prior to being able to communicate in a communications network, a device generally needs to be authenticated as a valid device in the communications network and be allocated a network address so that packets may be sent and received by the device. Authenticating the device typically entails exchanging messages in a protocol, such as an IEEE 802.1X, protocol for carrying authentication for network access (PANA), Internet key exchange (IKEv2), host identity protocol (HIP), extensible authentication protocol (EAP), and the like, with an authentication server, such as an authentication, authorization, and accounting (AAA) server, an authenticator, and the like, to authenticate the device and/or a user of the device and authorize the device for use in the communications network. Network address allocation usually entails exchanging messages in a protocol, such as dynamic host configuration protocol (DHCP), and the like) with an address server, such as a DHCP server, to assign an address to the device.

SUMMARY OF THE DISCLOSURE

Example embodiments of the present disclosure which provide a system and method for concurrent address allocation and authentication.

In accordance with an example embodiment of the present disclosure, a method coordinating network entry of a device is provided. The method includes authenticating, by a controller, the device coupled to the controller, and allocating, by the controller, an address for the device, wherein allocating the address for the device occur concurrently with but independently of authenticating the device. The method also includes completing, by the controller, the network entry of the device upon successful completion of authenticating the device and allocating the address for the device.

In accordance with another example embodiment of the present disclosure, a method for coordinating network entry of a device is provided. The method includes receiving, by a controller, an authentication request message in a single time instance from the device, and receiving, by the controller, an address assignment request message in the single time instance from the device. The method also includes processing, by the controller, the authentication request message, and processing, by the controller, the address assignment request message concurrently with but independently of processing of the authentication request message. The method further includes enabling, by the controller, data traffic upon successful completion of processing of the authentication request message and processing of the address assignment request message.

In accordance with another example embodiment of the present disclosure, a controller is provided. The controller includes a processor. The processor authenticates a device coupled to the controller, allocates an address for the device, wherein allocating the address for the device occur concurrently with but independently of authenticating the device, and completes a network entry of the device upon successful completion of authenticating the device and allocating the address for the device.

In accordance with another example embodiment of the present disclosure, a controller is provided. The controller includes a receiver, and a processor operatively coupled to the receiver. The receiver receives an authentication request message in a single time instance from a device, and receives an address assignment request message in the single time instance from the device. The processor operates on the authentication request message, operates on the address assignment request message concurrently with but independently of processing of the authentication request message, and enables data traffic upon successful completion of processing of the authentication request message and processing of the address assignment request message.

One advantage of an embodiment is that the concurrent execution of address allocation and authentication helps to reduce the latency involved in the two processes by liberalizing and decoupling the latency, thereby quickening network entry. Furthermore, a latency of when a data channel is ready to accept data traffic is shortened.

A further advantage of an embodiment is that the statuses of the completion of the address allocation and authentication are considered when determining when network entry completes.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to concurrent address allocation and authentication. For example, at a controller, the controller authenticates a device coupled to the controller, and allocates an address for the device, wherein allocating the address for the device occur concurrently with but independently of authenticating the device. The controller also completes the network entry of the device upon successful completion of authenticating the device and allocating the address for the device. As another example, at a controller, the controller receives an authentication request message in a single time instance from the device, and receives an address assignment request message in the single time instance from the device. The controller also processes the authentication request message, and processes the address assignment request message concurrently with but independently of processing of the authentication request message. The controller further enables data traffic upon successful completion of processing of the authentication request message and processing of the address assignment request message The present disclosure will be described with respect to example embodiments in a specific context, namely a communications system that uses authentication and address allocation as part of a network entry process for devices. The disclosure may be applied to wireless communications systems, wireline communications systems, or a combination thereof. The disclosure may be applied to communications systems that are standards compliant, such as IEEE 802.11, such as 802.11 through 802.11ai and beyond, as well as to other data network standards. Embodiments may be applied to all wireline and wireless data network devices that perform both authentication and network address acquisition during network attachment, such as Wi-Fi access points (APs), Wi-Fi stations (STAs).

Figure 1:
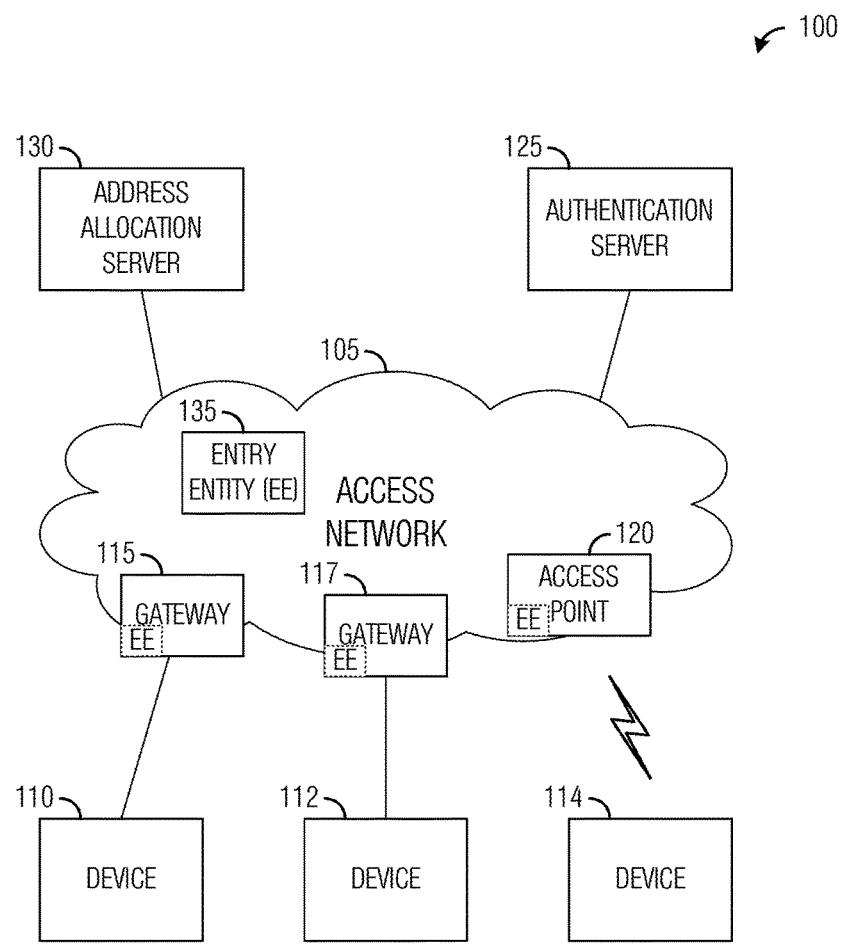
FIG. 1 illustrates an example communications system according to example embodiments described herein.

FIG. 1 illustrates a communications system 100. Communications system 100 includes an access network 105 that allows devices, such as device 110, device 112, and device 114, connectivity to services. The devices may connect to access network through wireline connectivity (such as device 110 and device 112) through a gateway, such as gateway 115 and gateway 117, or wireless connectivity (such as device 114) through an access point, such as access point 120. A device may also have both wireline and wireless connectivity.

Generally, when a device attaches to a communications system, such as communications system 100, it may need to perform network entry before it is capable of fully utilizing the communications system. A device may attach to a communications system in a variety of ways. As an example, a device may attach to the communications system over a wireline when a user of the device connects the device to the communications system with a communications cable. As another example, a device may attach to the communications system over a wireless connection when the device moves into a coverage area of the communications system. As another example, a device may attach to the communications system after a reboot, power cycle, reset, and the like.

Network entry may include authentication of the device, which may involve authenticating the credentials of the device, authorizing the device to use services (or a subset of the services) provided by the communications system, setup accounting processes for billing purposes, and the like. As an example, authentication of the device may utilize an authentication server 125, which may or may not be a part of communications system 100. An AAA server may be an example embodiment of authentication server 125. As an illustrative example, authentication server 125 may be implemented by an operator of communications system 100, so authentication server 125 may be a part of communications system 100 or a part of another communication system also operated by the operator. As another illustrative example, authentication server 125 may be operated by a third party contracted by the operator of communications system 100. In such a situation, authentication server 125 may be accessible by communications system 100 but not a part of communications system 100 per se.

Network entry may also include address allocation for the device. Generally, in order for a device to send and/or receive packets, the device needs to have an address. The address may be used as a destination address of packets destined for the device and a source address of packets originating from the device. As an example, address allocation may be implemented using an address allocation server 130. A DHCP server may be an embodiment of address allocation server 130. As with authentication server 125, address allocation server 130 may or may not be a part of communications system 100 depending on how address allocation is implemented.

Device authentication and address allocation for the device may be coordinated by an entry entity 135. Entry entity 135 may be responsible for initiating device authentication and/or address allocation. As an example, entry entity 135 may initiate device authentication and/or address allocation when it detects the attachment of a device to communications system 100. Entry entity 135 may also perform processing to support device authentication and/or address allocation. As an example, entry entity 135 may process incoming messages, generate outgoing messages, provide computational resources for authentication algorithms, address translation, and the like.

According to an example embodiment, entry entity 135 may be a centrally located entity in communications system 100 as shown in FIG. 1. As a centrally located entity, entry entity 135 may be coupled to gateways, access points, authentication server 125, and address allocation server 130. According to an alternative embodiment, entry entity 135 may be implemented in a distributed manner, with portions located at different locations in communications system 100. As an example, portions of entry entity 135 may be located in gateways (such as gateway 115 and gateway 117) and access points (such as access point 120) of communications system 100. Being located in gateways and access points of communications system 100 allows entry entity 135 to detect attachment of devices and coordinate device authentication and address allocation. As an example, portions of entry entity 135 may be implemented in a MAC layer of gateways and access points.

Figure 2:
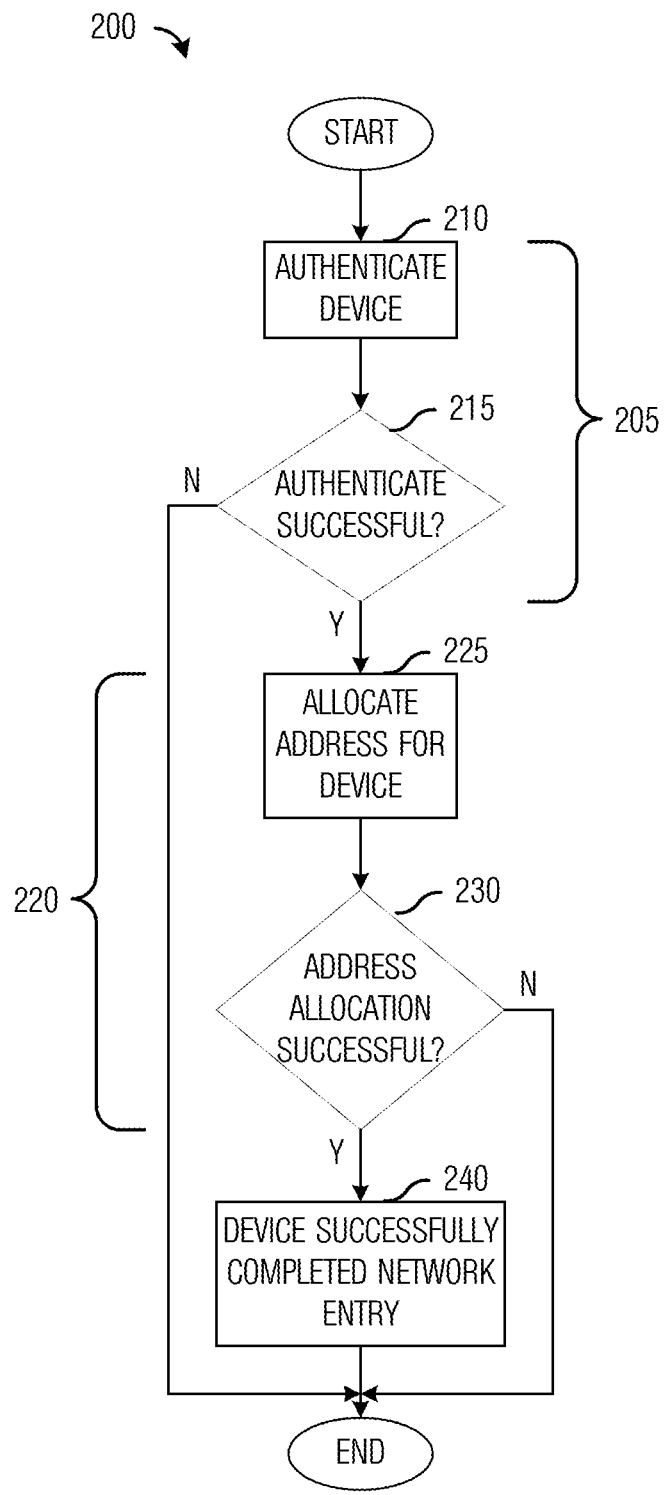
FIG. 2 illustrates an example flow diagram of operations in device network entry according to example embodiments described herein.

FIG. 2 illustrates a flow diagram of operations 200 in device network entry. Operations 200 may be indicative of operations occurring in an entry entity, such as entry entity 135 (either centrally located or distributed implementation), as the entry entity coordinates network entry of a device.

Operations 200 may begin with the entry entity performing an authentication process (blocks 205). The authentication process may include authenticating the device (block 210), which may include exchanging messages with an authentication server and/or the device using a protocol such as IEEE 802.1X, PANA, IKEv2, HIP, EAP, and the like. The entry entity may perform a check to determine if the authentication of the device succeeded successfully (block 215). If the authentication of the device did not succeed successfully, the entry entity may abandon the network entry for the device, retry the authentication of the device, wait and retry the authentication of the device, and the like.

If the authentication of the device succeeded successfully, the entry entity may perform an address allocation process (blocks 220). The address allocation process may include allocating an address to the device (block 225), which may include exchanging messages with an address allocation server and/or the device using a protocol such as DHCP. The entry entity may perform a check to determine if the address allocation for the device succeeded successfully (block 230). If the address allocation for the device did not succeed successfully, the entry entity may abandon the network entry for the device, retry the address allocation for the device, wait and retry the address allocation for the device, and the like.

If the address allocation for the device succeeded, the entry entity may deem that the device has successfully completed network entry (block 240). It is noted that network entry may involve additional operations and steps. However, the embodiments presented herein are focused on authenticating the device and address allocation for the device. Hence, any additional operations and steps typically involved with network entry are omitted.

It is noted that operations 200 present a sequential method of processing for authenticating the device and address allocation. Therefore, processing latency for when the device completes network entry (and hence when a data channel usable by the device) is a sum of the latencies of the two processes. It may be possible to reduce the processing latency by making the two processes concurrent. Concurrent processing of the authentication of the device and the address allocation can shorten the processing latency by overlapping at least a portion of the latency involved with each of the two processes. Generally, concurrent processing or concurrent execution refers to a situation where two or more tasks, operations, programs, procedures, and the like, are processed in such a way that at least a portion of the processing occurs at the same time or substantially the same time. As an example, consider a situation wherein there are two tasks (a first task and a second task) being performed. The processing of the first task and the second task may commence at the same time or at different times and the processing of the two tasks may end at the same time or at different times, but if there is a period of time where the two tasks are being processed at the same time or substantially the same time, then the two tasks are said to be processed concurrently or that they are executing concurrently. It is also noted that the processing of the two tasks may occur on different processing units or on a single processing unit.

Figure 3:
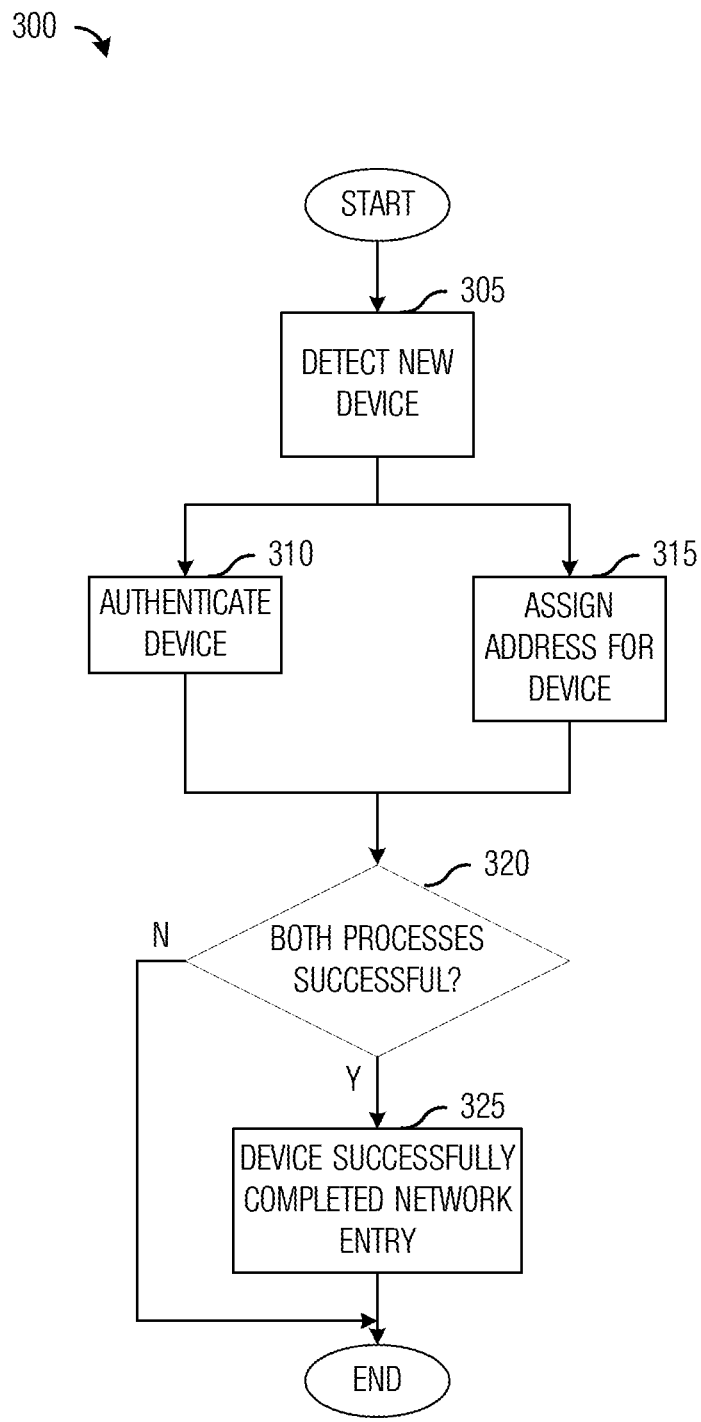
FIG. 3 illustrates an example flow diagram of operations in device network entry with concurrent processing according to example embodiments described herein.

FIG. 3 illustrates a flow diagram of operations 300 in device network entry with concurrent processing. Operations 300 may be indicative of operations occurring in an entry entity, such as entry entity 135 (either centrally located or distributed implementation), as the entry entity coordinates network entry of a device with concurrent processing.

Operations 300 may begin with the entry entity detecting a new device (block 305). As discussed previously, a new device may be detected when it attaches to a communications system. As an example, a device may attach to the communications system over a wireline when a user of the device connects the device to the communications system with a communications cable. As another example, a device may attach to the communications system over a wireless connection when the device moves into a coverage area of the communications system. As another example, a device may attach to the communications system after a reboot, power cycle, reset, and the like.

The entry entity may coordinate network entry for the new device. In order to reduce processing latency, the entry entity may concurrently process authentication for the device and address allocation for the device (blocks 310 and 315). As discussed previously, concurrent processing may allow for an overlapping of at least a portion of the latency involved in the two processes, thereby reducing the processing latency for network entry. It is noted that the processing occurs independently of one another. As part of authentication for the device, the entry entity may receive an indication of completion of the authentication. Similarly, as part of address allocation for the device, the entry entity may receive an indication of completion of the address allocation. As an illustrative example, for authentication, the entry entity may receive a message including security information for the device to indicate that the authentication has successfully completed. As another illustrative example, for address allocation, the entry entity may receive a message including an address allocated to the device to indicate that the address allocation has successfully completed. A detailed discussion of processing involved in authentication for the device and address allocation for the device is provided below.

The entry entity may perform a check to determine if both processes successfully completed (block 320). If both processes successfully completed, the entry entity may determine that the device has completed network entry (block 325). As part of network entry completion, a data channel for the device may be enabled, allowing packets to be sent and/or received by the device.

If both processes have not successfully completed with one or both processes have not completed at all, the entry entity may wait until both processes have completed. If both processes have not successfully completed with one or both processes unsuccessfully completing, the entry entity may retry the process (processes) that unsuccessfully completed, abort the network entry for the device, wait and retry the process (processes) that unsuccessfully completed, and the like.

According to an example embodiment, concurrent processing of authentication for the device and address allocation for the device may involve receiving a network allocation message in a single instance, receiving an authentication message in the single instance, processing the network allocation message, and processing the authentication message concurrently with but independently of the processing of the network allocation message. Examples of the single instance include single frame, an encapsulated protocol data unit, a resource allocation, a processing time window, and the like. Although the discussion describes the messages (i.e., the network allocation message and the authentication message) being received in a single instance, it is not intended to restrict the messages to being received together at the same time. According to an example embodiment, the messages may be received independently. According to an alternative example embodiment, the messages may be received together. According to an alternative example embodiment, the messages may be received merged together. It is noted that a first state machine responsible for controlling processing involved with authenticating the device and a second state machine responsible for address allocation for the device may be operate independently of each other. Independent operation may mean that the two state machines do not share information with one another.

According to an example embodiment, concurrent processing of authentication for the device and address allocation for the device may allow for address allocation messages and authentication messages to be transmitted in a single instance, but without constrained address information presentation or specific address allocation message assignment to specific authentication message traffic events. According to an example embodiment, concurrent processing of authentication for the device and address allocation for the device may allow for a combination of address allocation messages and authentication messages without the need for specific address allocation message assignment to specific authentication message traffic events or information element constraints.

Figure 4A:
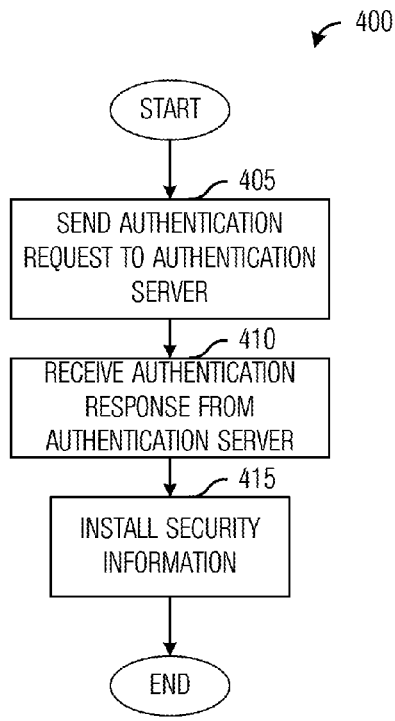
FIG. 4a illustrates an example flow diagram of operations in authenticating a device according to example embodiments described herein.

FIG. 4a illustrates a flow diagram of operations 400 in authenticating a device. Operations 400 may be indicative of operations occurring in an entry entity, such as entry entity 135 (either centrally located or distributed implementation), as the entry entity authenticates a device. It is noted that operations 400 is presented in view of a generic authentication protocol and that device authentication for a specific authentication protocol may differ.

Operations 400 may begin with the entry entity sending an authentication request to an authentication server (block 405). The authentication request may include identification information for the device, identification information for a user of the device, and the like. The entry entity may receive an authentication response from the authentication server (block 410). Generally, the authentication response may include information about the device, including whether or not the device has been authenticated, which service(s) the device is authorized to use, limitations on service(s), and the like. The entry entity may install security information with the device (block 415).

Figure 4B:
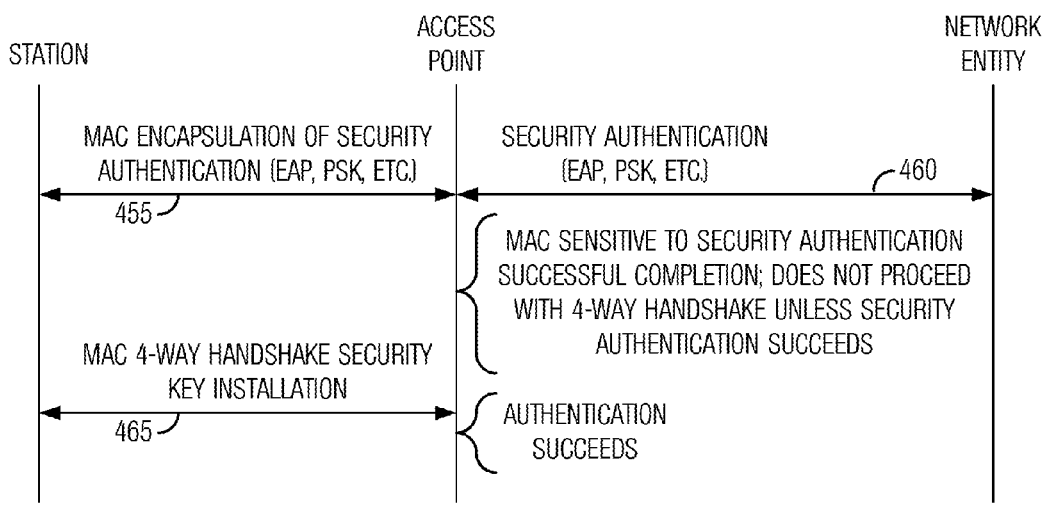
FIG. 4b illustrates an example diagram of messages exchanged in an authentication process for a device according to example embodiments described herein.

FIG. 4b illustrates a diagram 450 of messages exchanged in an authentication process for a device. As shown in FIG. 4b, diagram 450 illustrates messages exchanged in an authentication process for a device in an IEEE 802.11 compliant communications system. The message exchange involves message to and/or from a device (referred to as a station in IEEE 802.11), an entry entity (e.g., implemented in an access point in IEEE 802.11), and a network entity (e.g., an AAA server).

The authentication process for the device may include messages being exchanged between the station and the access point (shown as exchange 455). The messages may be in EAP, PSK, and the like, protocols. The messages exchanged between the station and the access point may be encapsulated in MAC layer PDUs. The access point and the network entity may exchange security authentication messages (shown as exchange 460). The security authentication messages may be in EAP, PSK, and the like, protocols.

According to an example embodiment, the access point (specifically, the entry entity located therein) may be sensitive to security authentication successful completion, i.e., the access point is capable of detecting when the authentication of the device completes successfully, and may not allow the authentication process to continue until the security authentication successfully completes. As the access point detects that the security authentication completes successfully, the access point and the station may exchange messages to install security information, such as security key(s) (shown as exchange 465). With the installation of the security information, the authentication of the device succeeds.

Figure 5A:
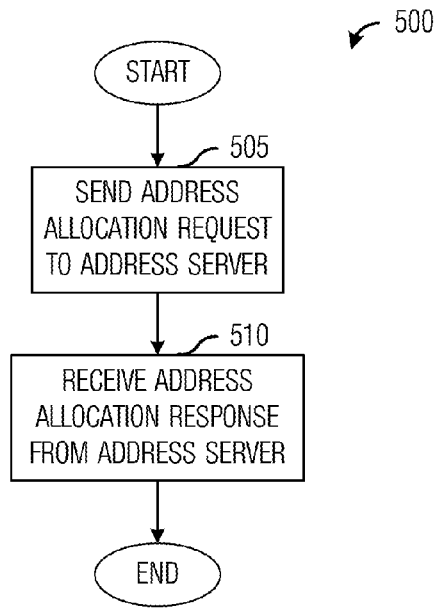
FIG. 5a illustrates an example flow diagram of operation in address allocation for a device according to example embodiments described herein.

FIG. 5a illustrates a flow diagram of operation 500 in address allocation for a device. Operations 400 may be indicative of operations occurring in an entry entity, such as entry entity 135 (either centrally located or distributed implementation), as the entry entity allocates an address for a device. It is noted that operations 400 is presented in view of a generic address allocation protocol and that device authentication for a specific address allocation protocol may differ.

Operations 500 may begin with the entry entity sending an address allocation request to an address server (block 505). The address allocation request may include identification information for the device, and the like. The entry entity may receive an address allocation response from the address server (block 510). The address allocation response may include an address allocated to the device.

Figure 5B:
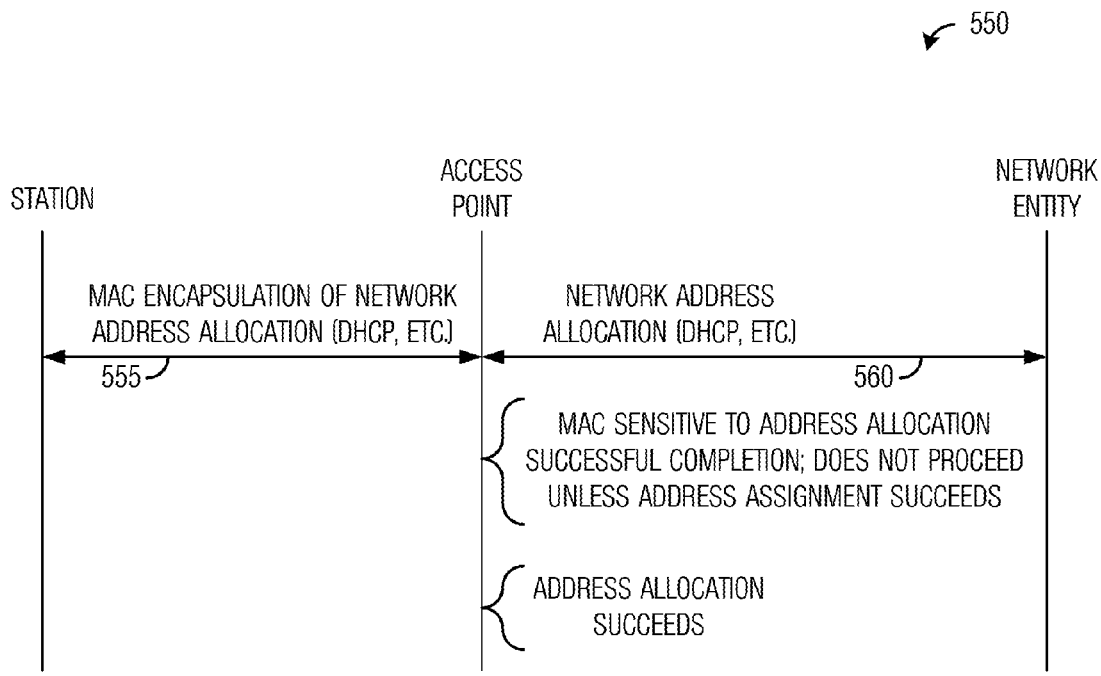
FIG. 5b illustrates an example diagram of messages exchanged in address allocation for a device according to example embodiments described herein.

FIG. 5b illustrates a diagram 550 of messages exchanged in address allocation for a device. As shown in FIG. 5b, diagram 550 illustrates messages exchanged in an address allocation for a device in an IEEE 802.11 compliant communications system. The message exchange involves message to and/or from a device (referred to as a station in IEEE 802.11), an entry entity (e.g., implemented in an access point in IEEE 802.11), and a network entity (e.g., a DHCP server).

The address allocation for the device may include messages being exchanged between the station and the access point (shown as exchange 555). The messages may be in a DHCP, and the like, protocol. The messages exchanged between the station and the access point may be encapsulated in MAC layer PDUs. The access point and the network entity may exchange address allocation messages (shown as exchange 560). The address allocation messages may be in DHCP, and the like, protocol.

According to an example embodiment, the access point (specifically, the entry entity located therein) may be sensitive to address allocation successful completion, i.e., the access point is capable of detecting when the address allocation for the device completes successfully, and may not allow the network entry to continue until the address allocation successfully completes. As the address allocation completes successfully, the access point may allow the network entry to continue.

Figure 6A:
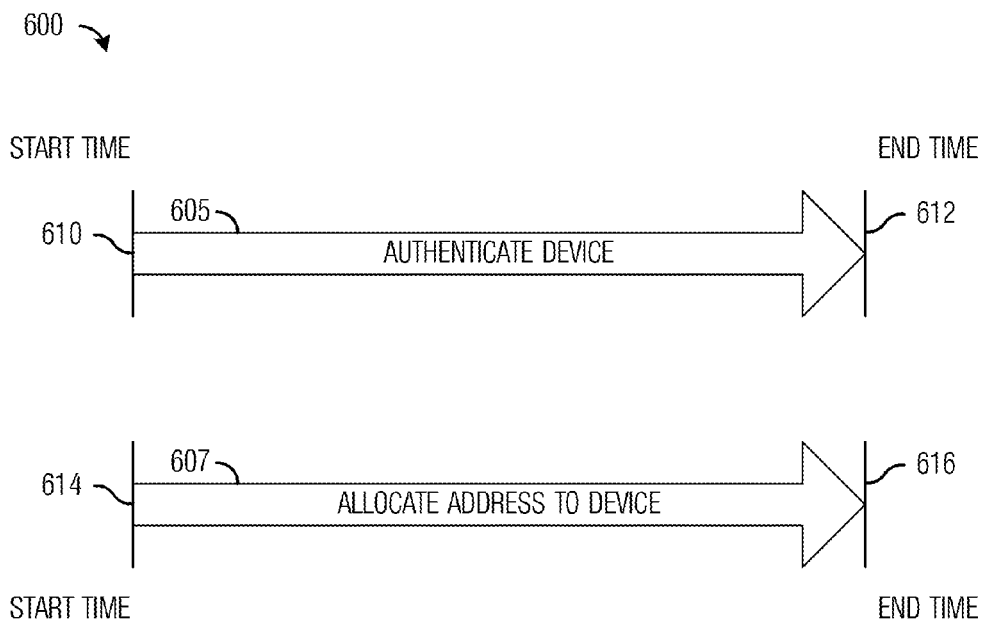
FIG. 6a illustrates an example timing diagram for concurrent processing of authenticating a device and address allocation for the device according to example embodiments described herein.

FIG. 6a illustrates a timing diagram 600 for concurrent processing of authenticating a device and address allocation for the device. Timing diagram 600 illustrates example processing times for authenticating a device (shown as time line 605) and for address allocation for the device (shown as time line 607). Processing time for authenticating the device may have a first start time (start time 610) and a first end time (end time 612), and processing time for address allocation for the device may have a second start time (start time 614) and a second end time (end time 616). It is noted that as shown in timing diagram 600, relative positions of start times 610 and 614 and end times 612 and 616 are not intended to convey any information about actual start times and end times and are for illustrative purposes only. As an example, there is no implication that the start times are equal nor the end times are equal.

Figure 6B:
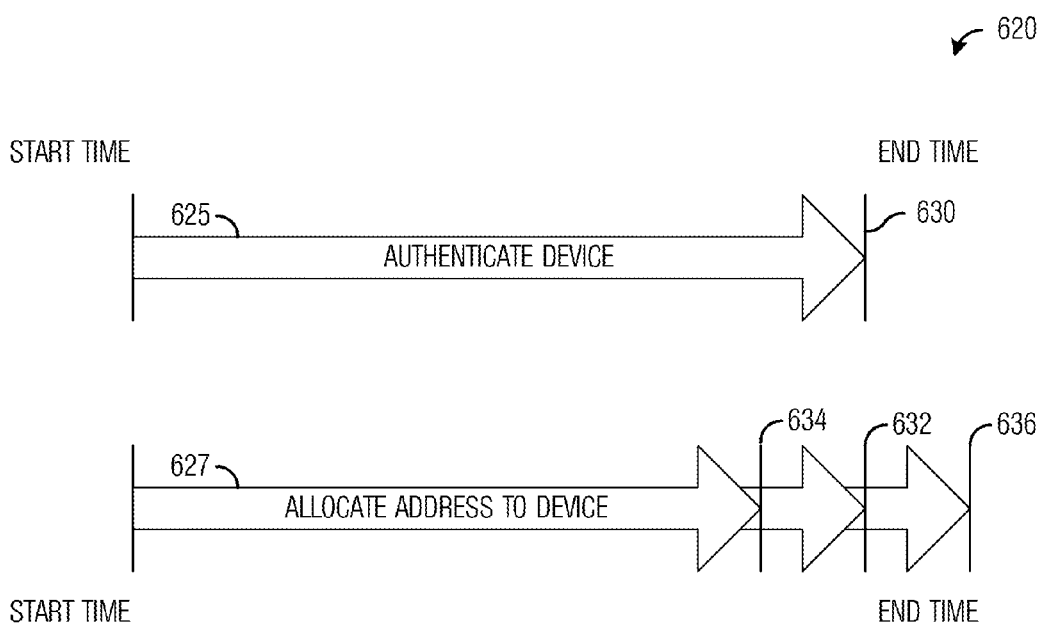
FIG. 6b illustrates an example timing diagram for concurrent processing of authenticating a device and address allocation for the device with different possible end time scenarios according to example embodiments described herein.

FIG. 6b illustrates a timing diagram 620 for concurrent processing of authenticating a device and address allocation for the device with different possible end time scenarios. An end time of a process (e.g., address allocation) may be about the same as an end time of another process (e.g., authentication). As shown in FIG. 6b, processing time of authenticating a device (time line 625) may end at end time 630, while processing time of address allocation for the device (time line 627) may end at substantially the same time (e.g., end time 632), at an earlier time (e.g., end time 634), or at a later time (e.g., end time 636).

Figure 6C:
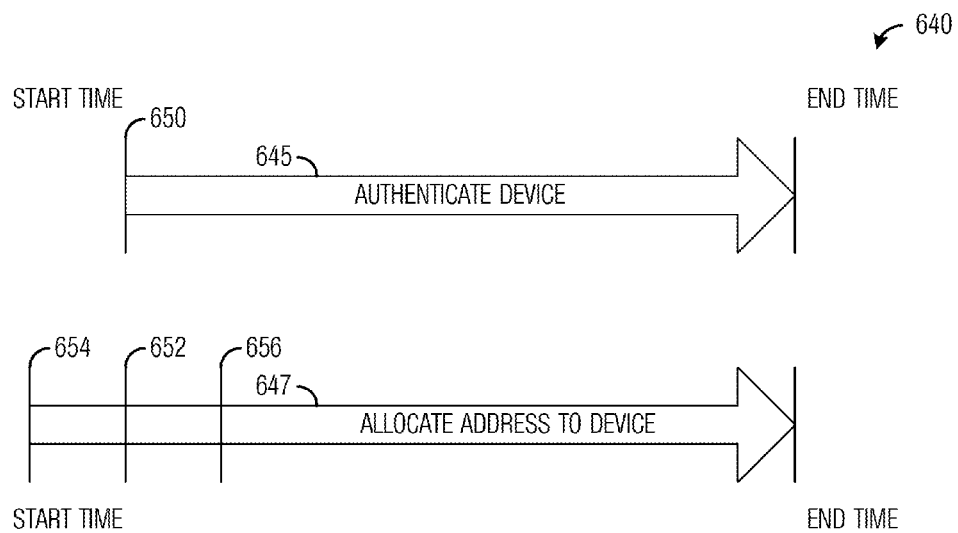
FIG. 6c illustrates an example timing diagram for concurrent processing of authenticating a device and address allocation for the device with different possible start time scenarios according to example embodiments described herein.

FIG. 6c illustrates a timing diagram 640 for concurrent processing of authenticating a device and address allocation for the device with different possible start time scenarios. A start time of a process (e.g., address allocation) may be about the same as a start time of another process (e.g., authentication). As shown in FIG. 6c, processing time of authenticating a device (time line 645) may start at start time 650, while processing time of address allocation for the device (time line 647) may start at substantially the same time (e.g., start time 652), at an earlier time (e.g., start time 654), or at a later time (e.g., start time 656).

Figure 6D:
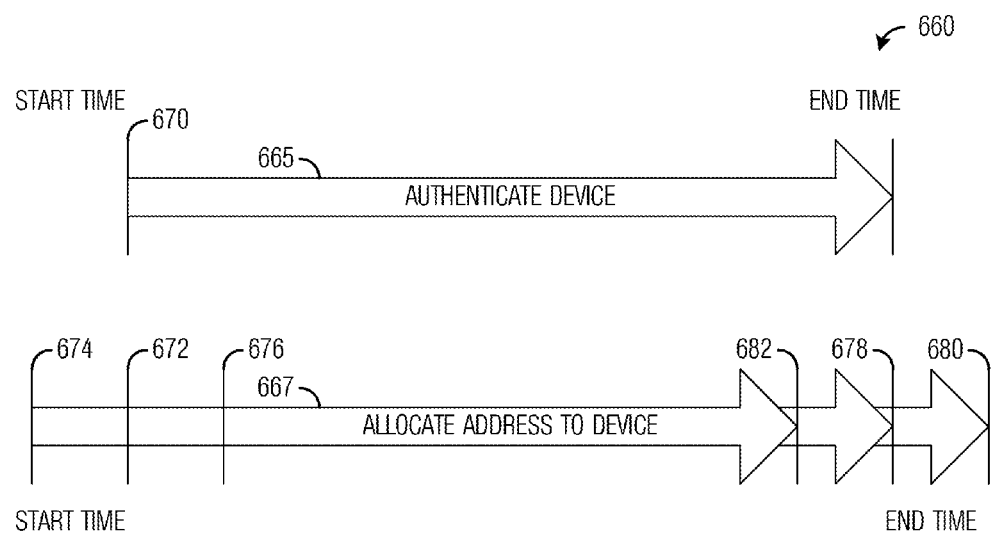
FIG. 6d illustrates an example timing diagram for concurrent processing of authenticating a device and address allocation for the device with different possible start time and end time scenarios according to example embodiments described herein.

FIG. 6d illustrates a timing diagram 660 for concurrent processing of authenticating a device and address allocation for the device with different possible start time and end time scenarios. A start time of a process (e.g., address allocation) may be about the same as a start time of another process (e.g., authentication). As shown in FIG. 6d, processing time of authenticating a device (time line 665) may start at start time 670, while processing time of address allocation for the device (time line 667) may start at substantially the same time (e.g., start time 672), at an earlier time (e.g., start time 674), or at a later time (e.g., start time 676). Similarly, processing time of address allocation for the device (time line 667) may end at substantially the same time (e.g., end time 678), at an earlier time (e.g., end time 682), or at a later time (e.g., end time 680).

In general, the processing involved with authenticating a device and the processing involved with address allocation may be controlled by independent state machines. The state machine controlling the authenticating a device and the state machine controlling the address allocation may be initiated independently and they can complete independently. For concurrent processing, at some point in time, both state machines are active at the same time. However, one state machine may initiate or complete prior to initiation and/or completion of the other state machine.

Figure 7:
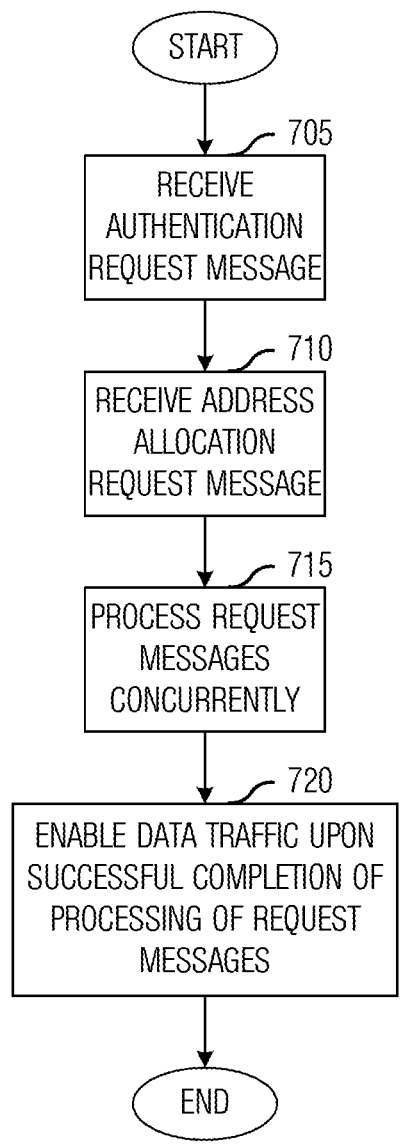
FIG. 7 illustrates an example flow diagram of operations in device network entry with concurrent processing of request messages according to example embodiments described herein.

FIG. 7 illustrates a flow diagram of operations 700 in device network entry with concurrent processing of request messages. Operations 700 may be indicative of operations occurring in an entry entity, such as entry entity 135 (either centrally located or distributed implementation), as the entry entity coordinates network entry of a device with concurrent processing.

Operations 700 may begin with the entry entity receiving an authentication request message (block 705). The entry entity may also receive an address allocation request message (block 710). As an example, the authentication request message and/or the address allocation request message may be explicit request messages received from a device attached to a communications system including the entry entity. As another example, the authentication request message and/or the address allocation request message may be implicit request messages in the form of some other message received from the device. As another example, the authentication request message and/or the address allocation request message may be a combination of explicit and implicit request messages.

The entry entity may process the authentication request message and the address allocation request message concurrently (block 715). Concurrent processing may imply that at least a portion of processing times of the authentication request message and the address allocation request message overlap. The entry entity may be sensitive to successful completion of the processing of the authentication request message and the address allocation request message and therefore, hold up completion of the device network entry until both the authentication request message and the address allocation request message processing complete. The entry entity may enable data traffic for the device upon successful completion of the processing for both the authentication request message and the address allocation request message (block 720).

According to an example embodiment, the network allocation message and the authentication message are received in a single instance, and the processing the network allocation message and the authentication message may occur concurrently but independently of one another. Examples of the single instance include single frame, an encapsulated protocol data unit, a resource allocation, a processing time window, and the like. Although the discussion describes the messages (i.e., the network allocation message and the authentication message) being received in a single instance, it is not intended to restrict the messages to being received together at the same time. According to an example embodiment, the messages may be received independently. According to an alternative example embodiment, the messages may be received together. According to an alternative example embodiment, the messages may be received merged together.

According to an example embodiment, data traffic is not enabled until successful completion of authentication, regardless of the network address message processing state. According to an example embodiment, functionality of address allocation messaging generally is preserved without processing or information element constraint.

Figure 8:
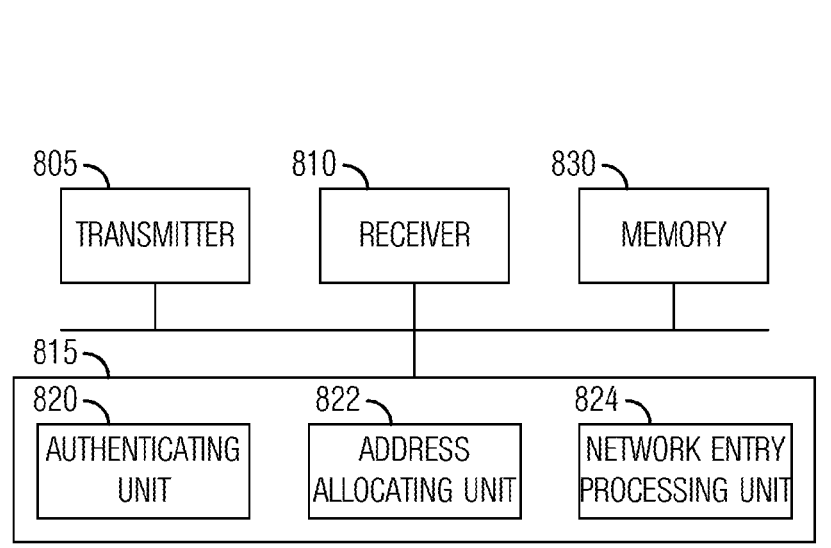
FIG. 8 illustrates an example diagram of a first communications device according to example embodiments described herein.

FIG. 8 illustrates a diagram of a first communications device 800. Communications device 800 may be an implementation of an entry entity of a communications system. Communications device 800 may be used to implement various ones of the embodiments discussed herein. As shown in FIG. 8, a transmitter 805 is configured to send messages, authentication messages, address allocation messages, and the like, and a receiver 810 is configured to receive messages, authentication messages, address allocation messages, and the like. Transmitter 805 and receiver 810 may have a wireless interface, a wireline interface, or a combination thereof.

An authenticating unit 820 is configured to process messages involved in authenticating a device. Authenticating unit 820 is also configured to provide processing involved in authenticating the device, as well as installing security information. An address allocating unit 822 is configured to process messages involved in allocating an address for the device. A network entry processing unit 824 is configured to coordinate operation of authenticating unit 820 and address allocating unit 822. Network entry processing unit 824 is configured to operate authenticating unit 820 and address allocating unit 822 in a concurrent manner. Network entry processing unit 824 is configured to be sensitive to successful completion of authenticating unit 820 and address allocating unit 822. A memory 830 is configured to store device information, authentication information, address information, security information, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, transmitter 805 and receiver 810 may be implemented as a specific hardware block, while authenticating unit 820, address allocating unit 822, and network entry processing unit 824 may be software modules executing in a processor 815, such as a microprocessor, a digital signal processor, a custom circuit, or a custom compiled logic array of a field programmable logic array. Additionally, authenticating unit 820, address allocating unit 822, and network entry processing unit 824 may be software modules stored in memory 830.

Figure 9:
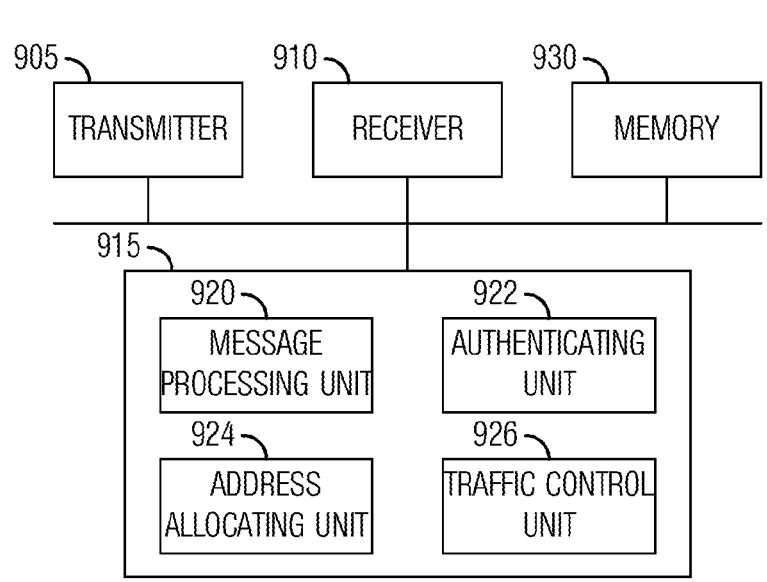
FIG. 9 illustrates an example diagram of a second communications device according to example embodiments described herein.

FIG. 9 illustrates a diagram of a second communications device 900. Communications device 900 may be an implementation of an entry entity of a communications system. Communications device 900 may be used to implement various ones of the embodiments discussed herein. As shown in FIG. 9, a transmitter 905 is configured to send messages, authentication messages, address allocation messages, and the like, and a receiver 910 is configured to receive messages, authentication messages, address allocation messages, and the like. Transmitter 905 and receiver 910 may have a wireless interface, a wireline interface, or a combination thereof.

A message processing unit 920 is configured to process request messages for device authentication and/or address allocation, for example. An authenticating unit 922 is configured to process messages involved in authenticating a device. Authenticating unit 922 is also configured to provide processing involved in authenticating the device, as well as installing security information. An address allocating unit 924 is configured to process messages involved in allocating an address for the device. A traffic control unit 926 is configured to enable or disable data traffic for a device that is in a process of network entry. Traffic control unit 926 is configured to enable or disable data traffic in accordance with successful completion of device authentication and address allocation. A memory 930 is configured to store device information, authentication information, address information, security information, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, transmitter 905 and receiver 910 may be implemented as a specific hardware block, while message processing unit 920, authenticating unit 922, address allocating unit 924, and traffic control unit 926 may be software modules executing in a processor 915, such as a microprocessor, a digital signal processor, a custom circuit, or a custom compiled logic array of a field programmable logic array. Additionally, message processing unit 920, authenticating unit 922, address allocating unit 924, and traffic control unit 926 may be software modules stored in memory 930.

Although the present disclosure and its advantages have been described in detail, it should be understood that various changes, substitutions and alterations can be made herein without departing from the spirit and scope of the disclosure as defined by the appended claims.

What is claimed is:

1. A method for coordinating network entry of a device, the method comprising:
   authenticating, by a controller, in a first process, the device coupled to the controller;
   allocating, by the controller, in a second process, an address for the device, the first process performed independently of the second processes, and the first process performed in parallel with the second process; and
   completing, by the controller, the network entry of the device upon successful completion of authenticating the device and allocating the address for the device.

2. The method of claim 1, wherein the controller comprises a media access control layer controller.

3. The method of claim 2, wherein the controller is located in one of a gateway and an access point serving the device.

4. The method of claim 1, further comprising receiving a first indication of successful completion of authenticating the device and receiving a second indication of successful completion of allocating the address for the device prior to completing the network entry of the device.

5. The method of claim 1, further comprising receiving a first message including a first indication of successful completion of authenticating the device and receiving a second message including a second indication of successful completion of allocating the address for the device prior to completing the network entry of the device.

6. The method of claim 1, wherein authenticating the device comprises exchanging messages in one of an IEEE 802.1X, a protocol for carrying authentication for network access, an Internet key exchange, a host identity protocol, and an extensible authentication protocol.

7. The method of claim 1, wherein allocating the address comprises exchanging message in a dynamic host configuration protocol.

8. The method of claim 1, further comprising enabling data traffic for the device.

9. A method for coordinating network entry of a device, the method comprises:

receiving, by a controller, an authentication request message in a single time instance from the device;

receiving, by the controller, an address assignment request message in the single time instance from the device;

processing, by the controller, the authentication request message;

processing, by the controller, the address assignment request message independently of processing of the authentication request message, and the processing of the address assignment request message is performed in parallel with the processing of the authentication request message; and enabling, by the controller, data traffic upon successful completion of processing of the authentication request message and processing of the address assignment request message.

10. The method of claim 9, wherein the single time instance comprises one of a single frame, an encapsulated protocol data unit, a resource allocation, and a processing time window.

11. The method of claim 9, wherein processing the authentication request message comprises transmitting one or more authentication messages, and wherein the address assignment request message is constrained to any one of the one or more authentication messages.

12. The method of claim 9, further comprising detecting a first indication of successful completion of authenticating the device and detecting a second indication of successful completion of allocating the address for the device prior to enabling the data traffic.

13. A controller comprising:
a processor; and
a non-transitory computer readable storage medium storing programming for execution by the processor, the programming including instructions to:
authenticate a device coupled to the controller,
allocate an address for the device, wherein the instructions to authenticate the device are performed in parallel with and independently of the instructions to allocate the address, and
complete a network entry of the device upon successful completion of authenticating the device and allocating the address for the device.

14. The controller of claim 13, wherein the controller comprises a media access control layer controller.

15. The controller of claim 14, wherein the controller is located in one of a gateway and an access point serving the device.

16. The controller of claim 13, further comprising a receiver operatively coupled to the processor, the receiver configured to receive a first indication of successful completion of authenticating the device and receiving a second indication of successful completion of allocating the address for the device prior to completing the network entry of the device.

17. The controller of claim 13, further comprising a receiver operatively coupled to the processor, the receiver configured to receive a first message including a first indication of successful completion of authenticating the device and receiving a second message including a second indication of successful completion of allocating the address for the device prior to completing the network entry of the device.

18. The controller of claim 13, wherein the processor is configured to enable data traffic for the device.

19. A controller comprising:
a receiver configured to receive an authentication request message in a single time instance from a device, and to receive an address assignment request message in the single time instance from the device; and
a processor operatively coupled to the receiver; and
a non-transitory computer readable storage medium storing programming for execution by the processor, the programming including instructions to:
operate on the authentication request message,
operate on the address assignment request message, wherein the instructions to operate on the authentication request message are performed in parallel with and independently of the instructions to operate on the address assignment request message, and
enable data traffic upon successful completion of processing of the authentication request message and processing of the address assignment request message.

20. The controller of claim 19, wherein the single time instance comprises one of a single frame, an encapsulated protocol data unit, a resource allocation, and a processing time window.

21. The controller of claim 19, further comprising a transmitter operatively coupled to the processor, the transmitter configured to transmit one or more authentication messages, and wherein the address assignment request message is constrained to any one of the one or more authentication messages.

22. The controller of claim 19, wherein the processor is configured to detect a first indication of successful completion of authenticating the device and detecting a second indication of successful completion of allocating the address for the device prior to enabling the data traffic.

* * * * *